(12) United States Patent
Wade et al.

(10) Patent No.: US 12,482,882 B2
(45) Date of Patent: Nov. 25, 2025

(54) SYSTEM AND METHOD FOR A REMOTE CMOS BATTERY

(71) Applicants: Jack Wade, La Jolla, CA (US);
Kirstine Wolfe, San Marcos, CA (US);
Joel Brown, Encinitas, CA (US)

(72) Inventors: Jack Wade, La Jolla, CA (US);
Kirstine Wolfe, San Marcos, CA (US);
Joel Brown, Encinitas, CA (US)

(*) Notice: Subject to any disclaimer, the term of this patent is extended or adjusted under 35 U.S.C. 154(b) by 497 days.

(21) Appl. No.: 18/099,219

(22) Filed: Jan. 19, 2023

(65) Prior Publication Data
US 2023/0261287 A1    Aug. 17, 2023

Related U.S. Application Data

(60) Provisional application No. 63/328,698, filed on Apr. 7, 2022, provisional application No. 63/300,988, filed on Jan. 19, 2022.

(51) Int. Cl.
*H01M 50/109* (2021.01)
*H01M 50/519* (2021.01)

(52) U.S. Cl.
CPC ....... *H01M 50/109* (2021.01); *H01M 50/519* (2021.01)

(58) Field of Classification Search
CPC .......................... H01M 50/109; H01M 50/519
See application file for complete search history.

(56) References Cited

U.S. PATENT DOCUMENTS

| | | | |
|---|---|---|---|
| 2008/0026714 A1* | 1/2008 | DiGiovanna | H04M 1/23 455/187.1 |
| 2014/0050945 A1* | 2/2014 | Kiger | H01M 10/425 429/7 |

* cited by examiner

*Primary Examiner* — Jane J Rhee
(74) *Attorney, Agent, or Firm* — Olivo IP Law Group, P.C.; John W. Olivo, Jr.

(57) ABSTRACT

The present invention pertains to an Active Battery System (ABS). The ABS eliminates the need for replacing the coin-cell CMOS battery when its service life has ended. The ABS enables a standard half-double-A battery to act as the CMOS battery and is replaceable via the front panel. Additionally, the ABS monitors the voltage of the battery and warns the user via an LED when to be replaced. The Active Battery System reduces unexpected server failures and maintenance time. The present invention comprises of a battery designed to be populated upon a circuit board is removed an exterior access point to the enclosure which contains the circuit board. The invention permits access to the battery to change it by relocating it to the front or exterior of a unit or to some accessible perimeter of a unit, with more convenience to avoid arduous disassembly.

1 Claim, 9 Drawing Sheets

SYSTEM AND METHOD FOR A REMOTE CMOS BATTERY

CROSS REFERENCE TO RELATED APPLICATIONS

This application claims the benefit of U.S. Provisional Patent Application Ser. No. 63/300,988 filed on Jan. 19, 2022, and U.S. Provisional Patent Application Ser. No. 63/328,698 filed on Apr. 7, 2022, the contents of which are incorporated herein by reference.

BACKGROUND OF THE INVENTION

The present invention offers a solution to enhance the functions and interoperability of various systems containing onboard power storage batteries which are typically difficult to physically access for changing or replacing. In space constrained military environments, such as aircrafts or ships, installation can be a tribulation due to the lack of space within a computer, and the challenges of access, particularly when various circuit boards are stacked in proximate relationship with one another leaving virtually no room to access storage batteries. CMOS (Complementary Metal-Oxide Semiconductor) standard batteries have low static power consumption with shorter lifespans, ranging approximately 3-4 years in certain environments. In a heated climate, battery drainage typically occurs in exponential rates. These batteries home the BIOS (Basic Input/Output System) settings, which store system time and date among other hardware settings. Therefore, the batteries are relatively flat and difficult to remove in the first place, but when disposed upon inaccessible or sequestered circuit boards, CMOS batteries are very difficult to reach, and attempting to reach them may often result in collateral damage to the resident circuit board.

Similarly, CMOS battery failures can generate symptoms such as unresponsive peripherals, difficulties with device start up, and other malfunctions. When a CMOS battery is defective, configuration data reverts to a set of default values. This poses a maintenance cost in commercial or industrial information technology ecosystems, and disruptions for those in a single-user one.

SUMMARY OF THE INVENTION

The solution is to be introduced with the present invention, which permits access to the device to advance to the front of a unit or to some accessible perimeter of a unit, with more convenience to avoid arduous disassembly. The extension, which consists of a uniquely designed PCB (Printed Circuit Board), attaches to a device's motherboard and enables the unit to fashion into a high-capacity battery at the forepart of a unit. The PCB fits within the motherboard and secures to an Environmental Control Board to monitor battery, voltage regulation, and to suitably access the CMOS battery. According to the present invention, the uniquely designed PCB serves the purpose of providing the requisite power interface required to hold the required charge (e.g., for onboard memory retention), but, the actual charge is delivered to the uniquely designed PCB by way of an extension connection to some exterior wall of the overall unit enclosure, to facilitate change the CMOS battery without having to actually disturb the mechanical interconnection upon the circuit board or mother board, etc.

The present invention pertains to a system and method for a remote CMOS battery. The remote battery PCB can be used in place of various CMOS batteries on commercial motherboards, which connect to a harness, and additionally to a remote battery. The remote battery is high capacity and is generally located in the frontal region of the unit, which is individual to the user of the invention. The present invention provides a solution to add aid in the usability of the system by supplying a front accessible CMOS battery. It is adaptable in placement of any CMOS battery on commercial motherboards, in the style of ruggedized technology. That is, the invention sanctions the replacement of a battery without the need to disassemble the circuit board, a feature of origination.

In one embodiment, the present invention supplies a system with the ability to utilize more space through its remote functionality. The invention employs a ½ AA, 3.3V battery as opposed to a coin cell CR2032 3V battery, which is the standard used to power CMOS batteries. Depictions of the present invention showcase a battery emulator within the overall assembly of the battery, and schematics of the battery emulator. Battery emulation upon a circuit board is a main feature of the present invention, whereby the actual battery may be of the same, less or preferably more capacity, to minimize the "downtime" that may be caused by a worn-out battery.

In another embodiment, the present invention can be implemented through an Active Battery System (ABS). The ABS eliminates the need for replacing the coin-cell CMOS battery when its service life has ended. The ABS enables a standard half-double-A battery to act as the CMOS battery and is replaceable via the front panel. Additionally, the ABS monitors the voltage of the battery and warns the user via an LED when to be replaced. The Active Battery System reduces unexpected server failures and maintenance time.

Other features and aspects of the invention will become apparent from the following detailed description, taken in conjunction with the accompanying drawings, which illustrate, by way of example, the features in accordance with embodiments of the invention. The summary is not intended to limit the scope of the invention, which is defined solely by the claims attached hereto.

BRIEF DESCRIPTION OF THE DRAWINGS

The various embodiments are illustrated by way of example, and not by way of limitation, in the figures of the accompanying drawings. Having thus described the invention in general terms, reference will now be made to the accompanying drawings, which are not necessarily drawn to scale, and wherein.

DETAILED DESCRIPTION OF THE PREFERRED EMBODIMENT

The present invention pertains to a system and method for a remote CMOS battery. The remote battery PCB can be used in place of various CMOS batteries on commercial motherboards, which connect to a harness, and additionally to a remote battery. The remote battery is high capacity and is generally located in the frontal region of the unit, which is individual to the user of the invention. The present invention provides a solution to add aid in the usability of the system by supplying a front accessible CMOS battery. It is adaptable in placement of any CMOS battery on commercial motherboards, in the style of ruggedized technology. That is, the invention sanctions the replacement of a battery without the need to disassemble the circuit board, a feature of origination.

The present invention permits access to the device to advance to the front of a unit or to some accessible perimeter of a unit, with more convenience to avoid arduous disassembly. The extension, which consists of a uniquely designed PCB (Printed Circuit Board), attaches to a device's motherboard and enables the unit to fashion into a high-capacity battery at the forepart of a unit. The PCB fits within the motherboard and secures to an Environmental Control Board to monitor battery, voltage regulation, and to suitably access the CMOS battery. According to the present invention, the uniquely designed PCB serves the purpose of providing the requisite power interface required to hold the required charge (e.g., for onboard memory retention), but, the actual charge is delivered to the uniquely designed PCB by way of an extension connection to some exterior wall of the overall unit enclosure, to facilitate change the CMOS battery without having to actually disturb the mechanical interconnection upon the circuit board or mother board.

In one embodiment, the present invention supplies a system with the ability to utilize more space through its remote functionality. The invention employs a ½ AA, 3.3V battery as opposed to a coin cell CR2032 3V battery, which is the standard used to power CMOS batteries. Depictions of the present invention showcase a battery emulator within the overall assembly of the battery, and schematics of the battery emulator. Battery emulation upon a circuit board is a main feature of the present invention, whereby the actual battery may be of the same, less or preferably more capacity, to minimize the "downtime" that may be caused by a worn-out battery.

In another embodiment, the present invention can be implemented through an Active Battery System (ABS). The ABS eliminates the need for replacing the coin-cell CMOS battery when its service life has ended. The ABS enables a standard half-double-A battery to act as the CMOS battery and is replaceable via the front panel. Additionally, the ABS monitors the voltage of the battery and warns the user via an LED when to be replaced. The Active Battery System reduces unexpected server failures and maintenance time.

Figure 1:
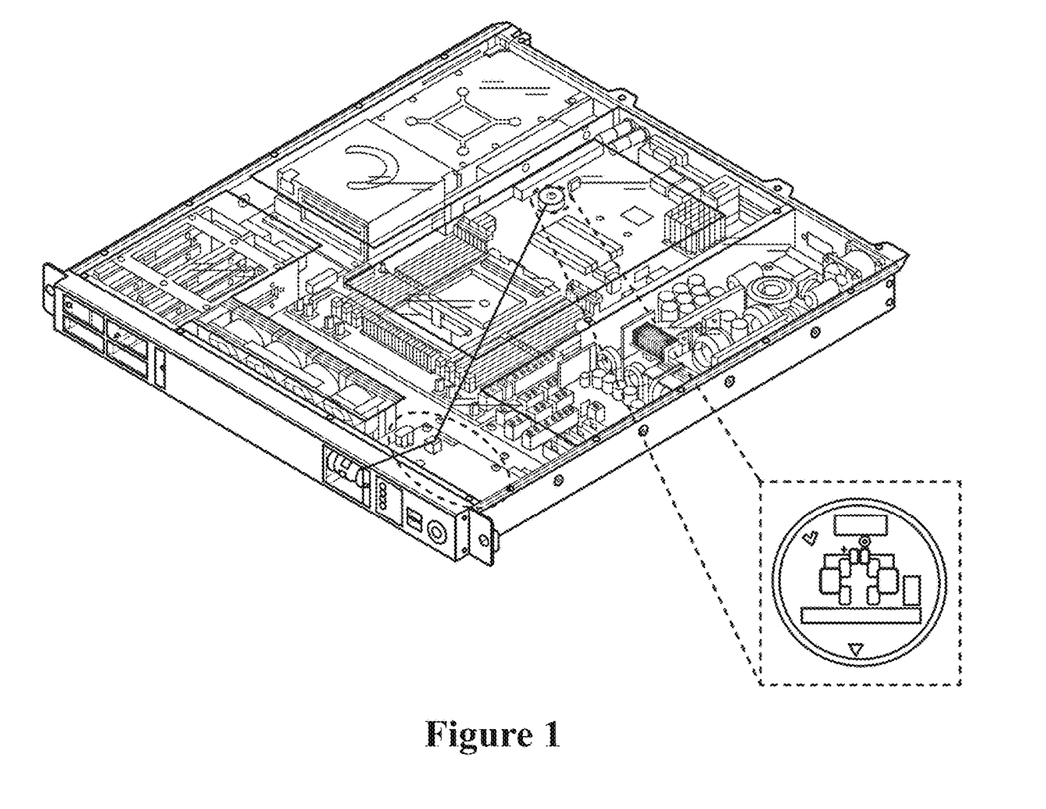
FIG. 1 is an overview of the present invention.

FIG. 1 is an overview of the present invention. In accordance with the preferred embodiment of the present invention, the red markings indicate a battery wire from a commercial off-the-shelf (COTS) motherboard to the Environmental Control Board (ECB). The yellow ellipse is a manifestation of the Environmental Control Board which interfaces to the battery and regulates the voltage to support an interface to a standard ½AA, 3.3V battery. The appendage consists of a PCBA (printed circuit board assembly) where the battery goes on the motherboard and a harness to the high-capacity frontal battery unit.

Figure 2A:
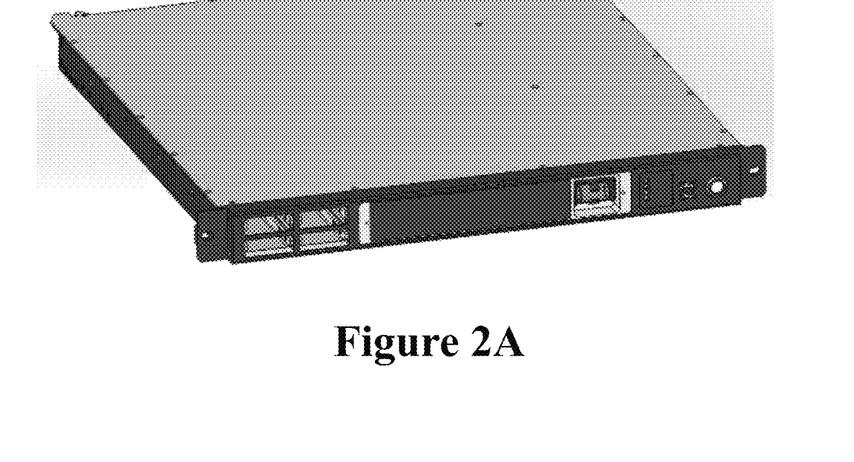
FIGS. 2A-B show the external view of the present invention.
Figure 2B:
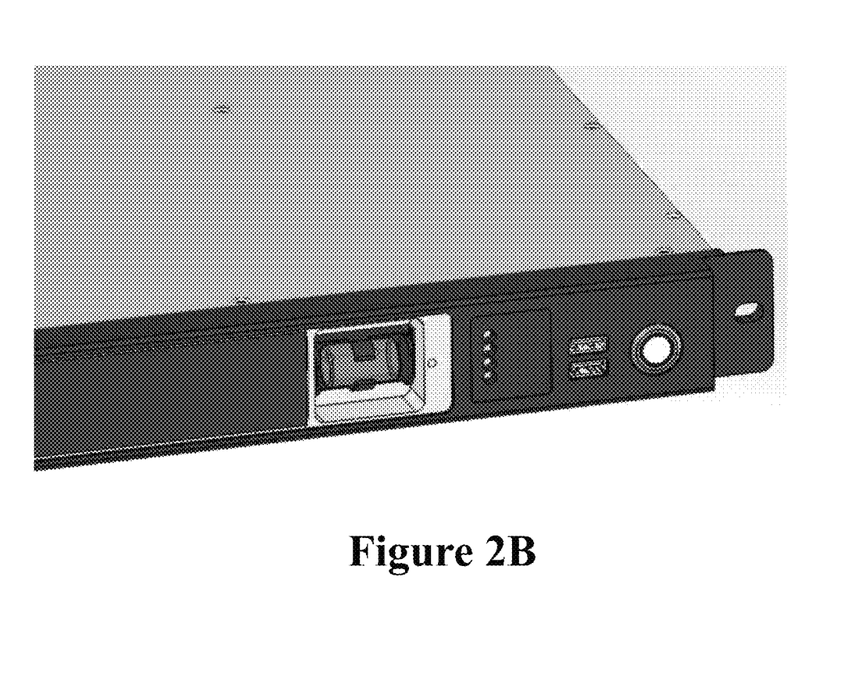

FIGS. 2A-B show the external view of the present invention. FIG. 2A shows an overall view of the invention. FIG. 2B shows a more detailed view of the ports for the battery wire, motherboard and ECB apparatus.

Figure 3A:
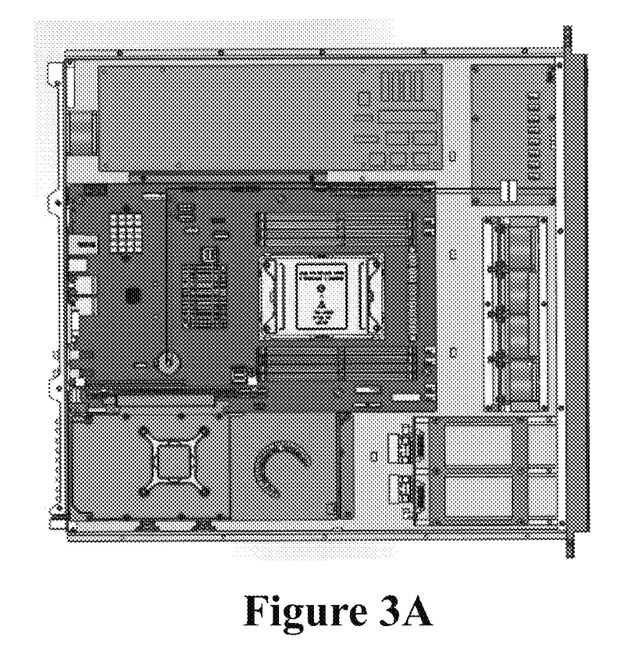
FIGS. 3A-B show the internal view of the present invention.
Figure 3B:
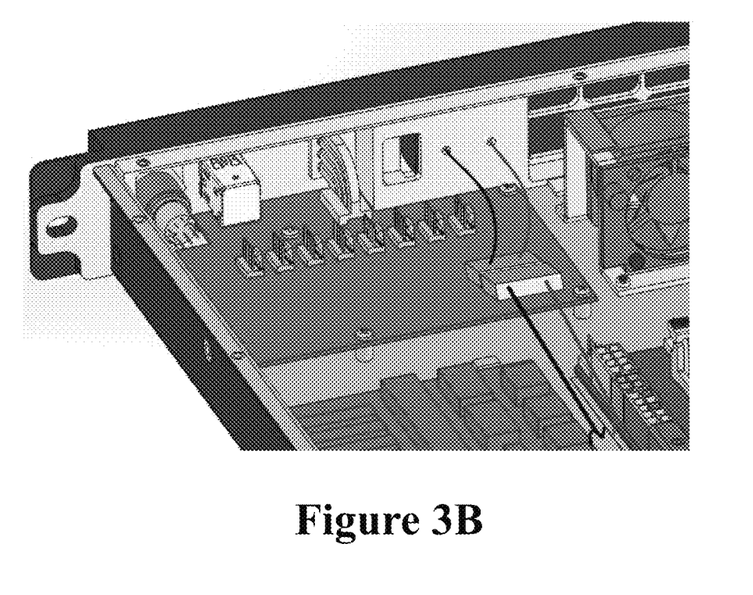

FIGS. 3A-B show the internal view of the present invention. FIG. 3A depicts a red line which represents the battery wire from the motherboard to the ECB. FIG. 3B shows the connection between the access way in FIG. 2B and the remote battery, which is harnessed to the board.

Figure 4:
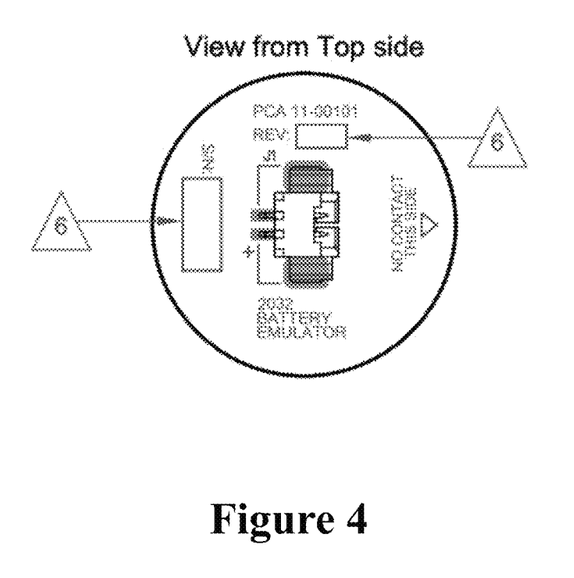
FIG. 4 is a schematic diagram of the PCB battery assembly of the present invention.

FIG. 4 is a schematic diagram of the PCB battery assembly of the present invention. The PCB battery contains a designation for serial and revision level numbers (marked by the triangle and 6), as well as ½ AA, 3.3V batteries that operate the board. Assembly contains requisites such as compliance with IPC-A-610, Class 2, current revision, and 90% solder fills with evidence of top side solder fillets, flat and clean connectors for alignment, masked mounting holes and exposed vias.

Figure 5:
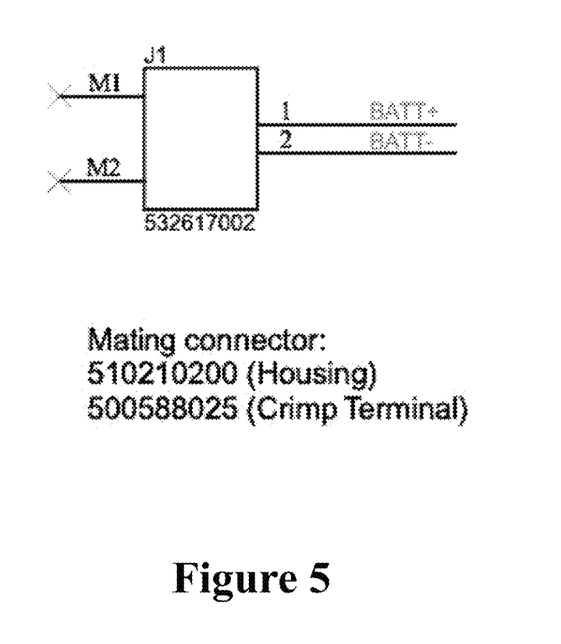
FIG. 5 is a schematic diagram of the PCB battery emulator of the present invention.

FIG. 5 is a schematic diagram of the PCB battery emulator of the present invention. The figure depicts battery charges, both positive and negative to harness energy for the emulator.

Figure 6A:
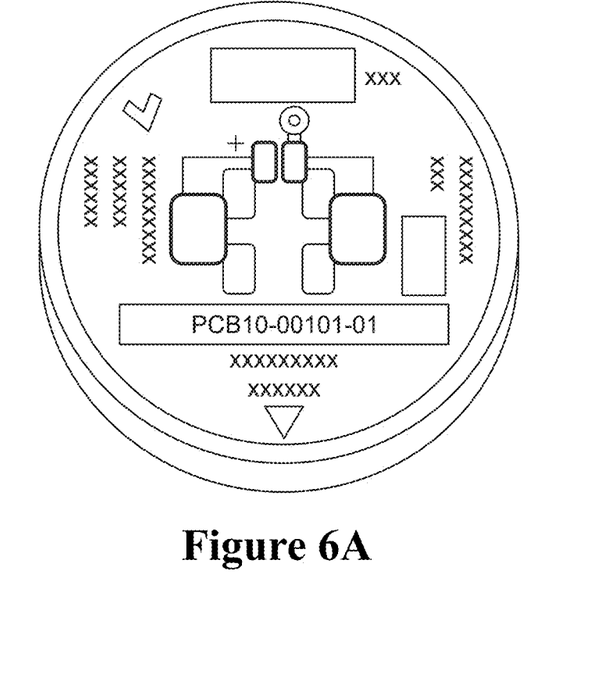
FIGS. 6A-B are images of the PCB battery of the present invention.
Figure 6B:
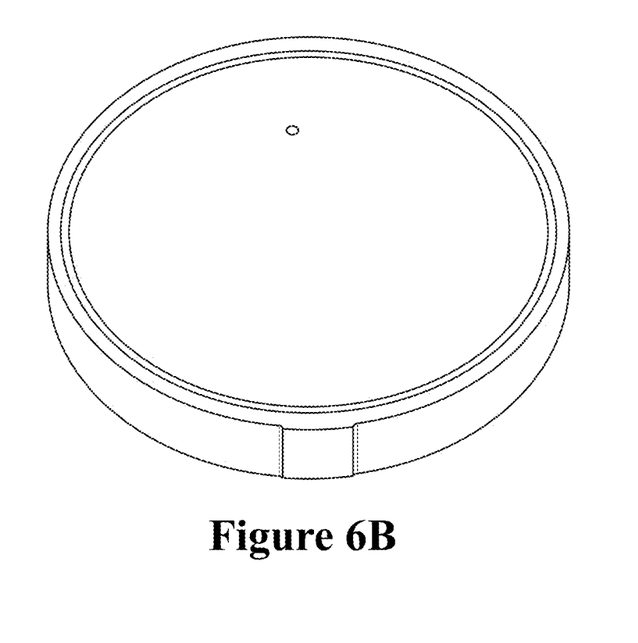

FIGS. 6A-B are images of the PCB battery of the present invention. FIG. 6A showcases the PCB which contain the elements of the battery emulator. FIG. 6B presents a rear-view layer of its flat copper backing.

Figure 7A:
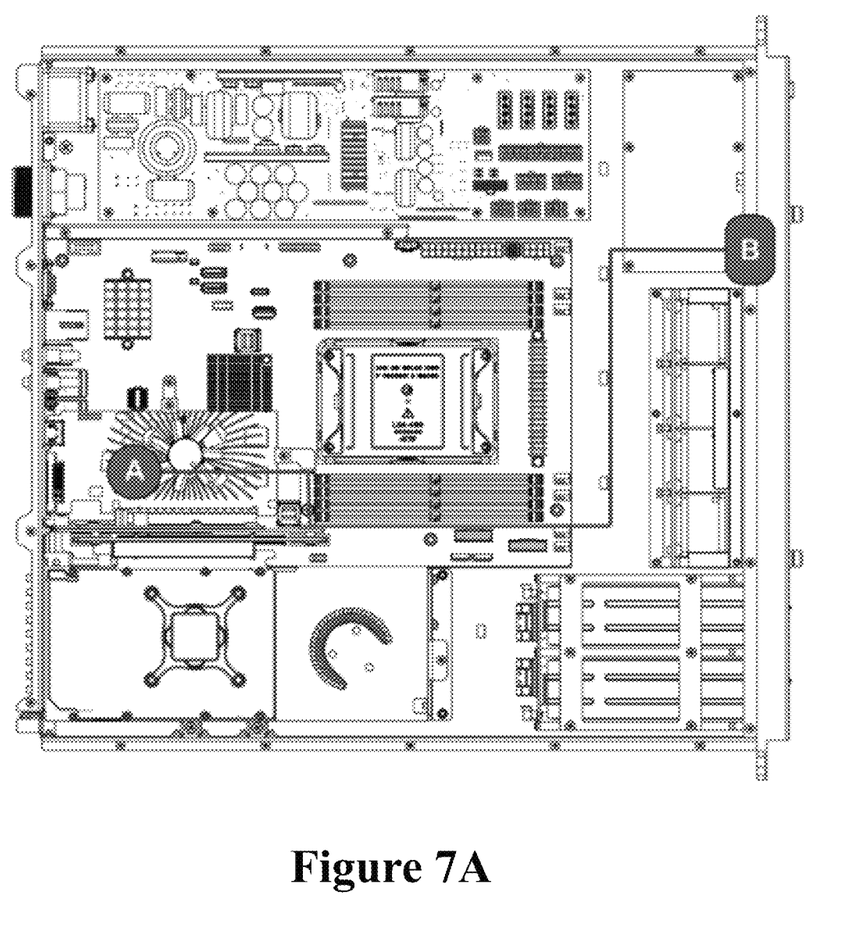
FIGS. 7A-C are images of the Active Battery System of the present invention.
Figure 7B:
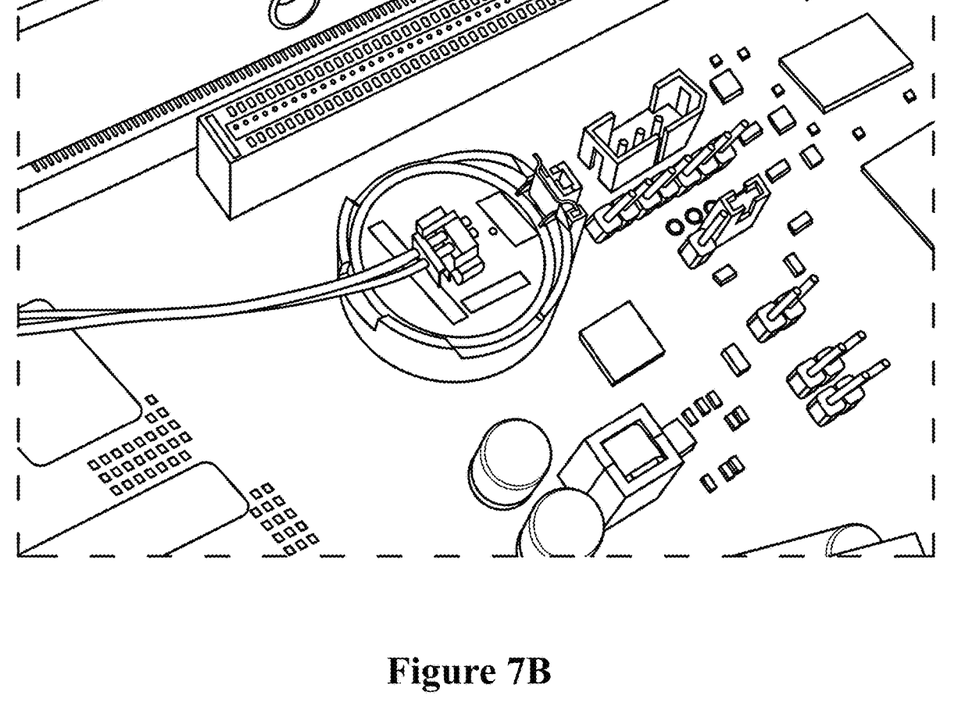
Figure 7C:
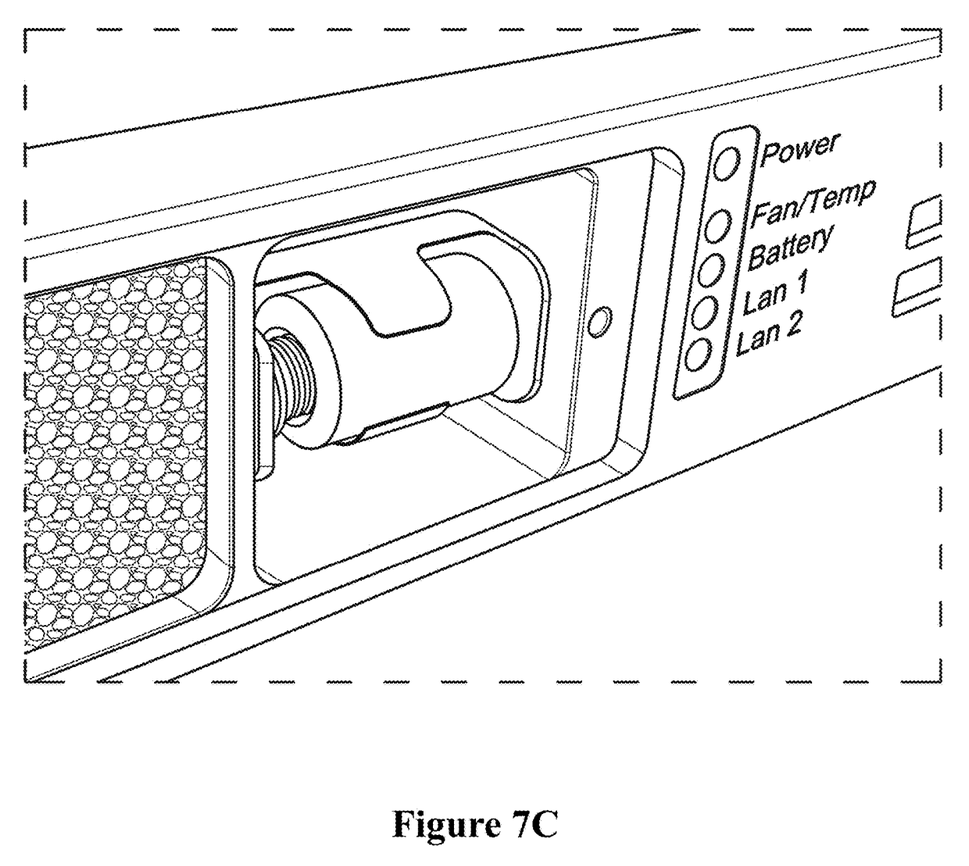

FIGS. 7A-C are images of the Active Battery System (ABS) of the present invention. FIG. 7A is a diagram of the ABS implemented into a server. The CMOS Battery (A) is connected to a battery (B). The ABS eliminates the need for replacing the coin-cell CMOS battery when its service life has ended. The ABS enables a standard half-double-A battery to act as the CMOS battery and is replaceable via the front panel. Additionally, the ABS monitors the voltage of the battery and warns the user via an LED when to be replaced. The Active Battery System reduces unexpected server failures and maintenance time. FIG. 7B is an image of the CMOS battery with a wire attachment that is connected to the battery, as shown in the image in FIG. 7C.

While various embodiments of the disclosed technology have been described above, it should be understood that they have been presented by way of example only, and not of limitation. Likewise, the various diagrams may depict an example architectural or other configuration for the disclosed technology, which is done to aid in understanding the features and functionality that may be included in the disclosed technology. The disclosed technology is not restricted to the illustrated example architectures or configurations, but the desired features may be implemented using a variety of alternative architectures and configurations. Indeed, it will be apparent to one of skill in the art how alternative functional, logical or physical partitioning and configurations may be implemented to implement the desired features of the technology disclosed herein. Also, a multitude of different constituent module names other than those depicted herein may be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the disclosed technology is described above in terms of various exemplary embodiments and implementations, it should be understood that the various features, aspects and functionality described in one or more of the individual embodiments are not limited in their applicability to the particular embodiment with which they are described, but instead may be applied, alone or in various combinations, to one or more of the other embodiments of the disclosed technology, whether or not such embodiments are described and whether or not such features are presented as being a part of a described embodiment. Thus, the breadth and scope of the technology disclosed herein should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

What is claimed is:

1. A battery emulation system on upon a circuit board comprising:
   a circuit board is removed an exterior access point to the enclosure which contains the circuit board;
   access to the battery to change it by relocating it to the front or exterior of a unit or to some accessible perimeter of a unit;
   an extension that attaches to a motherboard and enables the unit to fashion into a high-capacity battery at the forepart of a unit;
   a circuit board that fits within the motherboard and secures to an environmental control board to monitor battery, voltage regulation, and to suitably access the battery interface; and
   an active battery system that enables a standard half-double-A battery to act as the complementary metal-oxide-semiconductor battery that is replaceable through the front panel.

* * * * *